Nov. 19, 1963

J. POUILLOUX 3,111,444

TIRE BUILDING DRUM

Filed June 23, 1960

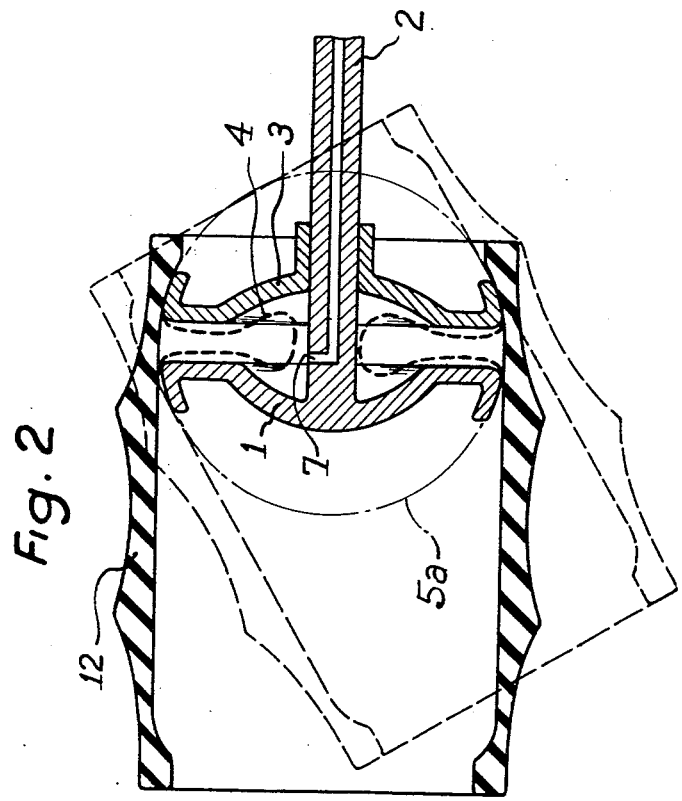

United States Patent Office 3,111,444
Patented Nov. 19, 1963

3,111,444
TIRE BUILDING DRUM
Jacques Pouilloux, Saint-Gratien, France, assignor to Pneumatiques et Caoutchouc Manufacture Kleber-Colombes, Paris, France, a corporation of France
Filed June 23, 1960, Ser. No. 38,274
Claims priority, application France June 25, 1959
6 Claims. (Cl. 156—416)

This invention relates to tire manufacturing machinery and, more particularly, to an improved drum for use as a support during the assembling into an annular band configuration of the several components comprising an inflatable tire.

The component elements of an inflatable vehicle tire include carcass plies of cord or fabric reinforced rubber, bead wires and other reinforcements utilized in the bead regions, tread and sidewall rubber and, sometimes, additional reinforcing means, commonly known as overheads, in the tread region. These several components are assembled, in the annular band building procedure for the manufacture of tires, by sequentially positioning the ply stock, bead cores, overheads, if used, sidewall and tread rubber upon a tire building drum so that the resulting product is generally annular in configuration and is termed a band. This band is then removed from the drum, shaped to a generally toroidal configuration, and subjected to vulcanizing heat and pressure to effect curing. Since the annular wires or cores of the tire beads are generally smaller in diameter than the diameter of the drum on which the band is built, the completed band cannot readily be removed from the drum without altering the dimensions of the drum. Therefore, it is customary either to employ collapsible or segmental drum structures which generally have been heavy and expensive, or drum structures made of a pair of generally disk-like, side members, across which a flexible bladder of cylindrical form is adapted to be stretched.

The principal object of this invention is to provide an improved tire building drum for use in annular band building of vehicle tires which drum is of simpler construction and includes a novel flexible bladder provided with special reinforcement structure.

Another object of the invention is the provision of an improved drum for annular band building of vehicle tires which drum employs fewer parts than presently used collapsible drums, is more readily altered to permit building of tires of different sizes and is adaptable to be used on machines of known types without requiring extensive alterations therein.

A further object of the invention is an improved tire building drum for use in annular band building of vehicle tires characterized in that the completed tire band may be readily removed from the drum with less distortion and stresses upon the band than occurs when using conventional collapsible drums.

Other and further objects of the invention will be apparent from the following description of the presently preferred embodiment thereof, and certain modifications, described with reference to the accompanying drawing, forming a part of this application, and in which:

FIG. 2 is a somewhat schematic view in axial section illustrating the position of several parts of the drum shown in FIG. 1 when moved to the configuration for the removal of the completed tire band, the flexible bladder of the drum being indicated only by a dot-dash line and details of the side members being omitted to facilitate illustration.

Figure 1:
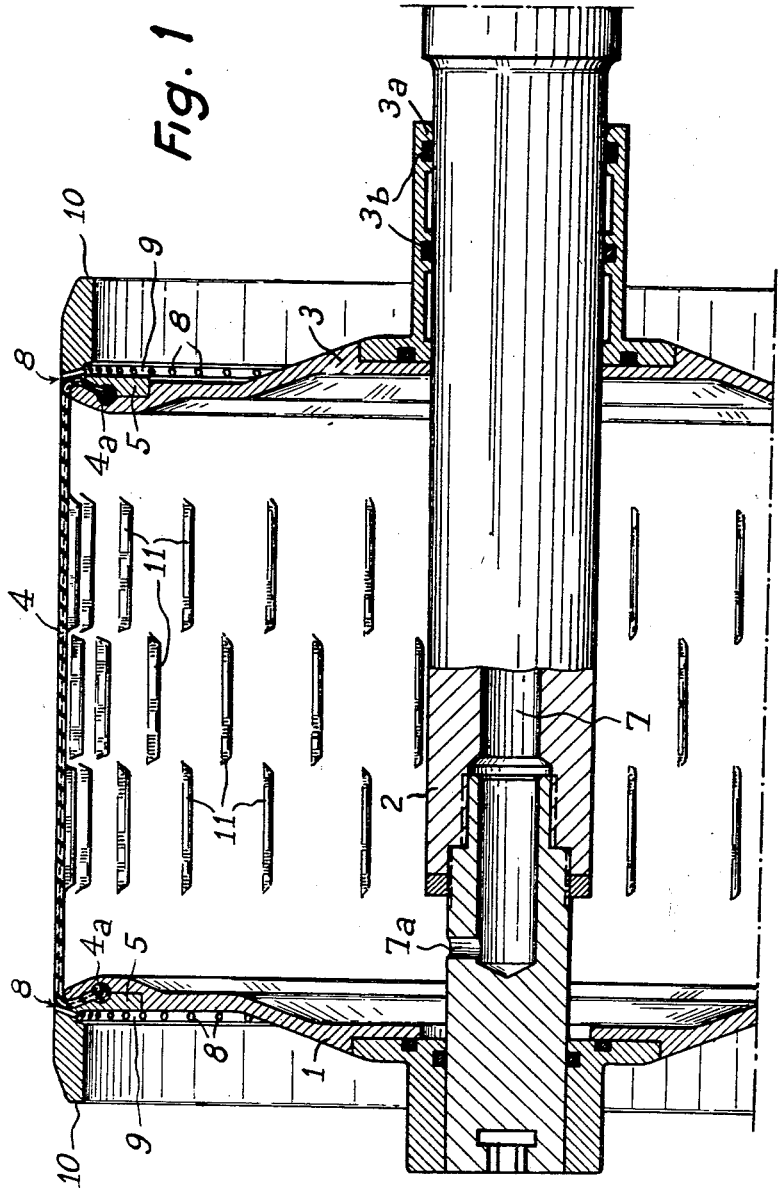
FIG. 1 is a fragmentary, somewhat diagrammatic, view in axial section through the presently preferred embodiment of a tire building drum with the drum shown in the tire building or operative position.

A collapsible tire building drum structure incorporating the principles of this invention is illustrated in FIG. 1 as comprising a pair of generally disk-like side members 1 and 3 which are coaxially supported upon a common shaft 2 that may be attached to or comprise the shaft of an existing tire building machine, not shown. The side members 1 and 3 are, as shown in FIG. 1, preferably formed in several annular pieces which are suitably connected together, by means not shown, to provide an air-impervious construction. One of the side members, here shown as a member 1, is stationarily supported upon the end of the shaft 2 and the other side member, here shown as the member 3, is axially, slidable thereon in fluid pressure sealing relationship. For this purpose the member 3 has an axially extending annular sleeve portion 3a slidably engaged upon the shaft and provided with sealing rings or gaskets 3b. It will be understood that the shaft 2 and the side members 1 and 3 are intended to be rotated and hence the side members may be provided with suitable expedients, such as keys or the like, to prevent rotation relative to the shaft.

A generally annular bladder 4 of flexible, fluid impervious material is supported upon and connected to the peripheries of the side members 1 and 3 and cooperates therewith to provide a fluid-tight enclosure. For this purpose, the edges of the bladder 4 are clamped between the outer surfaces of the side members 1 and 3 and removable clamping members or rings 5. The bladder 4 preferably comprises rubber or other elastomer reinforced so that it is axially inextensible by reinforcements of wire or the like extending from edge to edge of the bladder with the ends of the reinforcements turned about annular wires 4a which form enlarged bead regions at the edges of the bladder that are received in cooperating recesses of the side members 1 and 3 and the cooperating clamping rings 5. The rings 5 may be removably retained upon the side members 1 and 3 by suitable means such as bolts or the like, not shown.

The drum is disposed substantially as shown in FIG. 1 during the time when the tire components are to be assembled thereon to form the generally annular configuration known as an annular band. This position of the drum is effected by moving the side member 3 to its axially most remote position with respect to the side member 1 thereby disposing the bladder 4 in a generally cylindrical configuration.

The construction of the bladder 4 and the tension to which it is subjected may be such as to provide a sufficiently rigid support for assembly of the tire components in the construction of a tire upon the drum. If desired, however, this rigidity may be supplemented by applying fluid under pressure, such as compressed air, to the interior of the drum through a bore 7 extending axially through the shaft 2 and communicating with the region between the side members and bladder by one or more ports 7a.

It will be observed that the clamping members or rings 5 for the edges of the bladder 4 have integral flanges the outer surfaces of which form smooth continuations of the surface of the bladder but curve from the cylindrical configuration of the latter to provide peripheral surfaces which are substantially spherical segments. As will be apparent from FIG. 2, these flange surfaces lie within a spherical envelope, indicated by the circle 5a in FIG. 2, when the drum is in its collapsed condition. During the tire manufacturing process, these flanges of the rings 5 support the bead core wires of the tire and the portions of the reinforcing plies of the carcass which are folded about the beads. Hence, the necessary stitching of the edges of the carcass plies about the bead cores in effected upon rigid surfaces. The general L-shape cross sectional configuration of the rings 5 also has the important advantage of providing a clear space beneath the beads of the tire band being assembled for facilitating the turning of the ply edges about the bead cores.

To facilitate withdrawal of the tire blank from the drum, it may be advantageous to provide the lateral surface 10 of one or both rings 5 with ribs or grooves, in parallel or crossed directions e.g. a knurled pattern.

When the tire band 12 has been completely formed, as indicated in solid section in FIG. 2, the tire building drum is collapsed to permit removal of the band. In this operation, the side member 3 is moved towards the side member 1 and the bladder 4 collapses radially inwardly between the side members as indicated by the dot-dash line representation in FIG. 2 in which figure the actual bladder has been omitted and the side members shown as of one-piece construction for simplicity of illustration, when the side members 1 and 3 have reached substantially the position shown in FIG. 2 the peripheries of their clamping rings or flanges 5 fit, as aforementioned, within an imaginary sphere, indicated by the circle, 5a, the center of which is on the axis of the drum. It is thus possible to swing or rock the tire band 12 to the position as shown in broken lines in FIG. 2 from which position it can be easily removed from the drum by imparting only a slight deformation thereto to permit passage of the right-hand bead region over the side member 3.

The folding of the bladder radially inwardly between the side members 1 and 3 as the latter approach each other can be effected by applying reduced pressure to the interior of the drum through the bore 7 and port 7a by means of a vacuum pump or the like.

The inner wall of the flexible axially inextensible bladder 4 may be provided with circumferentially spaced strips integrally molded on the wall to cause neat regular folds to form as the bladder is collapsed. These strips, which are indicated at 11 in FIG. 1, may be so arranged that the bladder will fold up according to a star pattern, a spiral pattern, or any other appropriate geometric configuration. The exterior of the bladder may be formed with grooves or ridges extending longitudinally or in more than one transverse direction to facilitate venting of air while the ply stock is being applied to the drum. This air venting is further facilitated by the provision of vent openings 8 extending through the flanges of the clamping rings 5. These vents, as well as the aforementioned grooves or ridges on the outer surface of the bladder, also permit the entrance of air when the drum is collapsed and the band is to be removed. The vents 8 open into a circumferential groove 9 to avert their being obstructed during rotation of the drum. The provision of grooves or ribs on the outer surface of the bladder also provides resistance to tangential stresses upon the tire band during manufacture thereof which might otherwise cause undesirable slippage between the band and the drum.

The aforementioned vents 8 extending through the flanges of the tire building drum may, as shown in FIG. 1, simply communicate with the atmosphere on the lower sides of these flanges.

The annular bladder of the drum may, in addition to the axially extending reinforcements, previously mentioned, include reinforcement extending generally normal to the axis of the drum. This latter reinforcement may comprise a circular roll formed of a web of fabric, or a coil formed of a single wire or cable spirally wound, with the reinforcement having a diameter equal to that selected for the drum. Such a circular reinforcement enables the bladder to withstand considerable internal pressure while retaining a perfect cylindrical shape so that by delivering compressed air into the drum through the bore 7 and port 7a a very hard tire building surface is provided thus permitting the successive plies forming the tire carcass to be united under strong stitching pressure. In addition to maintaining the bladder in rigid condition under tire building pressures, the internal pressure will also serve to assist in hodling the side members in their maximum axial spacing. In fact, in some cases, it is possible to employ the sequential application of elevated and reduced pressure for moving the side member 3 thereby effecting further simplicity of construction and reduction of cost. This additional reinforcement in the bladder may extend throughout the mid portion of the bladder preferably terminating a sufficient distance axially inwardly from the side members 1 and 3 so that this region of the bladder will have greater flexibility and thereby facilitate the disposal of the bladder between the side members when the drum is collapsed.

It will now be apparent that drums constructed in accordance with this invention possess the advantage of uniformity in the spacing of the side members upon successive operations since this spacing is determined by the length of the axially extending reinforcements embedded in the walls of the bladder. Moreover, this reinforcement and the tensioning of the bladder resulting from the axial spacing of the side members until restrained by the bladder provides the desired rigidity of the drum surface and this can be effected without the use of compressed air internally of the drum although such compressed air may be utilized if desired. The construction of the drum, as herein disclosed, also makes it possible to provide a bladder having a thin wall and hence highly flexible thereby facilitating its folding within the drum so that the side members can be brought closer together than has heretofore been possible. This in turn enables the completed tire band to be removed over the side members with only minimum deformation of the band and frictional drag on the drum. Furthermore, this removal is greatly facilitated by the aforementioned segmental spherical configuration of the side rings which clamp the edges of the bladder. Moreover, a drum constructed in accordance with this invention is easily adapted to use on standard tire building machines, in substitution for the heavy expensive drums currently in use, without expensive alterations in the machine. It is also possible to readily modify a building drum made in accordance with this invention to permit construction of tires of different sizes without complete replacing of the drums as has heretofore been necessary. Thus, the drum can be adapted for building tires of the same diameter but having different cross sectional sizes by simply providing bladders of different axial extents. When the diameter of the tire to be built is to be changed, it is possible to replace part only of the side members 1 and 3. It is not, therefore, necessary to stock complete drums in different sizes.

It will be apparent that, although certain modifications have been specifically mentioned and illustrated, these are not inclusive of all changes which may be made while retaining the principles of the invention. Hence, the invention is not to be considered as limited except as required by the spirit and scope of the appended claims.

Having thus described the invention, what is claimed is:

1. A tire building drum for use in building vehicle tires by superposing ply stock in annular band form and turning the edge portions thereof about annular bead cores, the said drum comprising a pair of generally disk-like rigid side members, a flexible generally annular air-impervious bladder connected at its edges to said side members, means supporting said side members in coaxial relationship in a manner permitting relative axial movement thereof from an initial position wherein the said bladder is generally cylindrical and the side members are spaced apart their maximum amount to a position in which the said side members are adjacent each other and the central portion of said bladder is collapsed radially inwardly between the said side members, the said side members including rigid flange portions extending axially outwardly from the side members with the radial outer surfaces of the flange portions forming smooth continuations of the surface of the bladder and curving therefrom as segments of a sphere having its center on the axis of the drum, the outer end faces of said flange portions forming surfaces for positioning of bead cores during building of a tire band on the drum and the flange portions having a width and thickness such as to provide an unobstructed region radially inwardly thereof adjacent the end faces, whereby the peripheral outer surfaces of the flange portions provide rigid support for the marginal parts of an annular tire band during building thereof on the drum, the unobstructed region beneath the flange portions permits turning of the tire band ply stock about bead cores placed on the end faces of the flange portions, and the segmental surfaces of the flange portions facilitate removal of the tire band from the drum when building of the band is completed and the side members have been moved adjacent each other.

2. A tire building drum as defined in claim 1 further comprising air-venting passages through the said flange portions axially outwardly of the said bladder.

3. A tire building drum as defined in claim 1 further comprising air-venting passages through the said flange portions axially outwardly of the said bladder with the passages through each flange portion terminating in a circumferentially extending groove on the radially inner surface of that flange portion.

4. A tire building drum as defined in claim 1 wherein the said bladder has a plurality of spaced ribs integral with the inner surface thereof for facilitating radially inward collapse of the central portion of the bladder when said side members are moved axially toward each other.

5. A tire building drum as defined in claim 1 wherein the said flange portions are annular ring members generally L-shaped in cross section removably connected to the said side members with each edge portion of the said bladder clamped between one of said ring members and the side member to which it is connected.

6. A tire building drum as defined in claim 1 wherein the said side members have axially extending recesses in their axially inner faces adjacent the axis thereof to accommodate the said bladder when the latter is collapsed radially inwardly.

References Cited in the file of this patent

UNITED STATES PATENTS

| | | |
|---|---|---|
| 1,777,405 | Frank | Oct. 7, 1930 |
| 1,789,143 | Kraft | Jan. 13, 1931 |
| 1,896,214 | Bostwick | Feb. 7, 1933 |
| 1,921,473 | Mather | Aug. 8, 1933 |
| 2,416,523 | Haren | Feb. 25, 1947 |